M. T. Kennedy,
Dressing Staves.

No. 13,035.   Patented June 12, 1855.

UNITED STATES PATENT OFFICE.

M. T. KENNEDY, OF FALLSTON, PENNSYLVANIA.

MACHINE FOR PLANING STAVES.

Specification of Letters Patent No. 13,035, dated June 12, 1855.

*To all whom it may concern:*

Be it known that I, M. T. KENNEDY, of Fallston, in the county of Beaver and State of Pennsylvania, have invented a new and Improved Machine for Planing or Dressing the Outer Surfaces of Staves; and I do hereby declare that the following is a full, clear, and exact description of the same, reference being had to the annexed drawings, making a part of this specification, in which—

Figure 1:
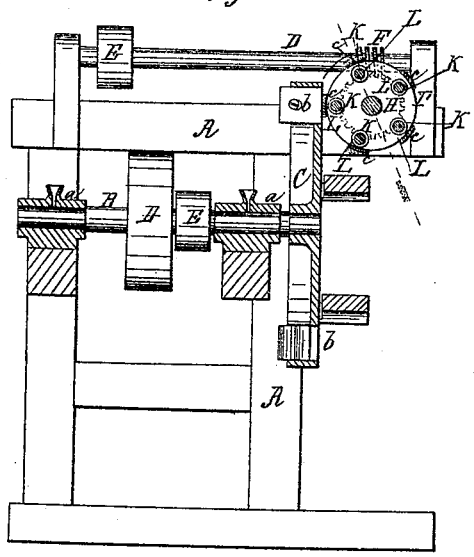
Figure 2:
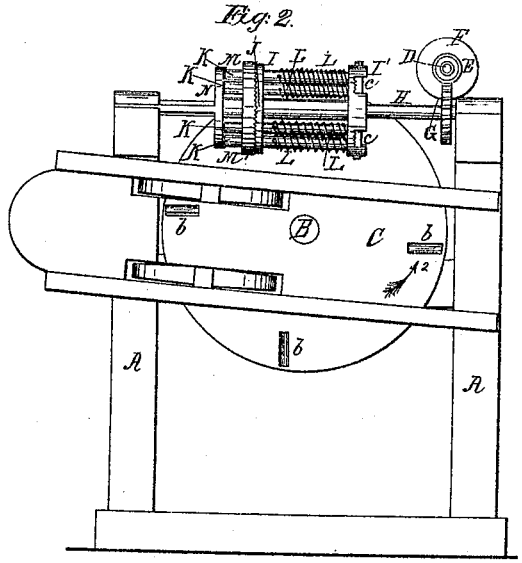
Figure 3:
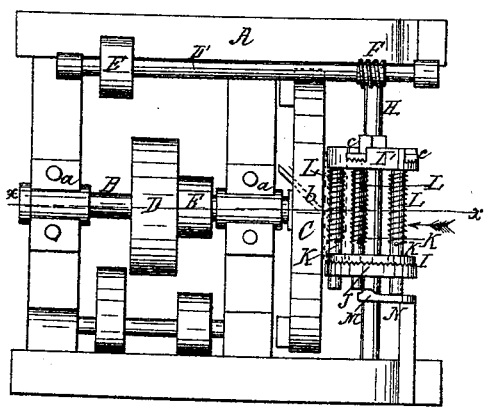
Figure 4:
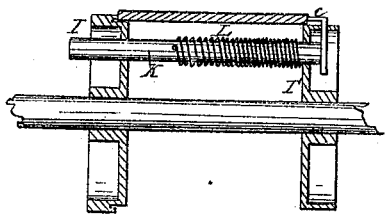

Figure 1, is a transverse section of my improved machine, (*x*) (*x*) Fig. 3, showing the plane of section. Fig. 2, is a side view of ditto. Fig. 3, is a plan or top view of ditto. Fig. 4, is a detached longitudinal section of the rotating clamp in which the staves are secured.

Similar letters of reference indicate corresponding parts in the several figures.

This invention relates to a new and improved machine for dressing and planing the outer sides of keg and barrel staves, and consists in the combination of a rotating disk provided with cutters, and a rotating clamp for holding the staves while being operated upon by the cutter. The above parts being constructed and arranged, as will be hereafter fully shown and described.

To enable others skilled in the art to make and use my invention, I will proceed to describe its construction and operation.

A represents the frame of the machine constructed in any proper manner to support the working parts.

B, represents a horizontal shaft running in suitable bearings (*a*) (*a*) on the frame A and having a circular metallic disk C at one end, said disk being provided with radial cutters (*b*), four or more, near its edge or periphery. The cutters may be secured to the disk C in any proper manner, and their cutting edges are on the outer side of the disk as shown in Figs. 2 and 3. On the shaft B, there are driving pulleys D, E, by which motion is given the shaft B and disk C.

On the upper part of the frame A and at one side there is a horizontal shaft D′ which has a driving pulley E, at one end, and a screw F at the opposite end. The screw F gears into a worm wheel G at one end of a shaft H which is parallel with the outer side of the disk C, as clearly shown in Fig. 3. On the shaft H, there are two circular disks I, I′, which are permanently secured to the shaft at a suitable distance apart corresponding to the length of the staves to be planed or dressed. Around the disk I there is placed a band J having its inner edge serrated as clearly shown in Figs. 2 and 3.

K are rods, the ends of which pass through the two disks I, I′. Each rod has a lip (*c*) at one end, shown more particularly in Fig. 4. The outer ends of these lips are bent over the outer edge or surface of the disk I′ and the edges of the lips are serrated as clearly shown in Figs. 2 and 3. Around each of the rods K there is wound a spiral spring L which keep the lips (*c*) over the outer edge or surface of the disk I′. The other ends of the rods pass through the disk I.

M, M′, are stationary cams which are at the ends of a semicircular band N, attached to one end of the frame A and directly back of the disk I, see Figs. 2 and 3. The disks I, I′ and rods K with the springs L and lips (*c*) form a rotating clamp.

Motion is given the disk C, by means of a belt passing over either of the driving pulleys D E, and motion is given the clamp by means of a belt passing over the pulley E on the shaft D′, the shaft H and clamp being rotated in consequence of the screw E and worm wheel G. Now as the clamp rotates the uppermost rod K will be acted upon by the cam M which bears against its end and forces it forward so that its lip (*c*) will be forced outward from the disk I′, and the stave, see red lines Figs. 1 and 2, is then inserted between the lip, and the edge of the band J, and when the uppermost rod K passes the cam M, its spiral spring L will draw the lip (*c*) of said rod firmly against the edge of the stave, and the stave will then be secured between the edge of the lip and the edge of the band J. The staves are all secured in the clamp in this way, viz, inserted as the clamp rotates between the lip of the uppermost rod and the band J, the cam M permitting this by forcing out the lip and allowing the insertion of the stave.

The clamp rotates in the direction of arrow 1, and the disk C in the direction of arrow 2, and as the staves in the clamp come in contact with the cutters (*b*) they are dressed or planed, as they pass around on the clamp and when the ends of the rods come in contact with the cam M′ the lips (c) are again forced forward or out from the disk I′ and the staves fall from the clamp.

The above machine operates well in practice, is economical to manufacture, and is not liable to get out of repair.

I do not claim separately the rotating disk C with the cutters (b) attached, for that has been used for analogous purposes, but

What I claim as new and desire to secure by Letters Patent, is—

The combination of the disk C and clamp, the clamp being formed of a series of rods K passing through the disks I, I′, and provided with springs L and lips (c) arranged and operating in the manner and for the purpose as herein shown and described.

M. T. KENNEDY.

Witnesses:
DAVID STEWART,
JOHN ALLISON.